March 27, 1934.  R. W. SNYDER ET AL  1,952,469
COMBINATION PRODUCT
Filed Jan. 17, 1931
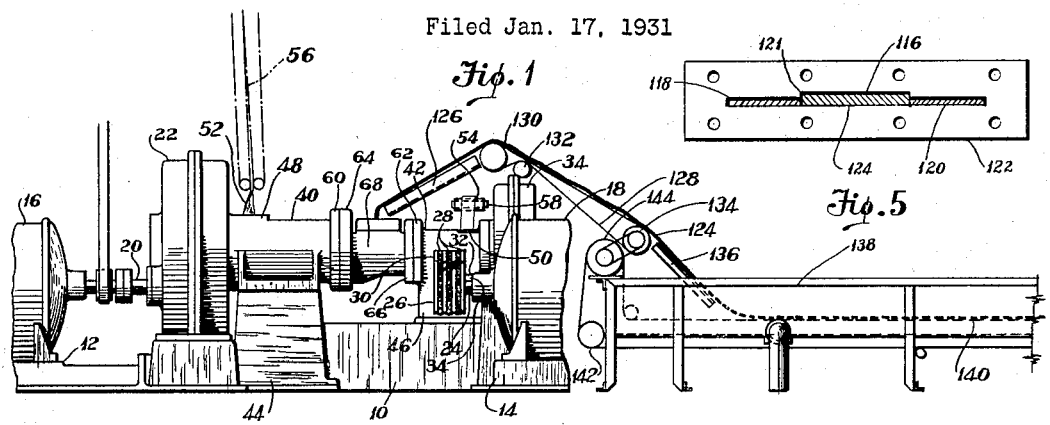
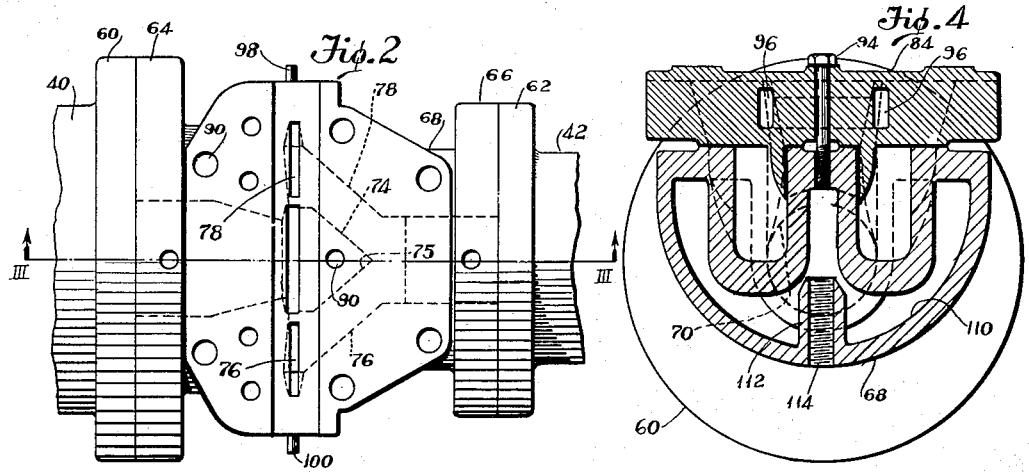
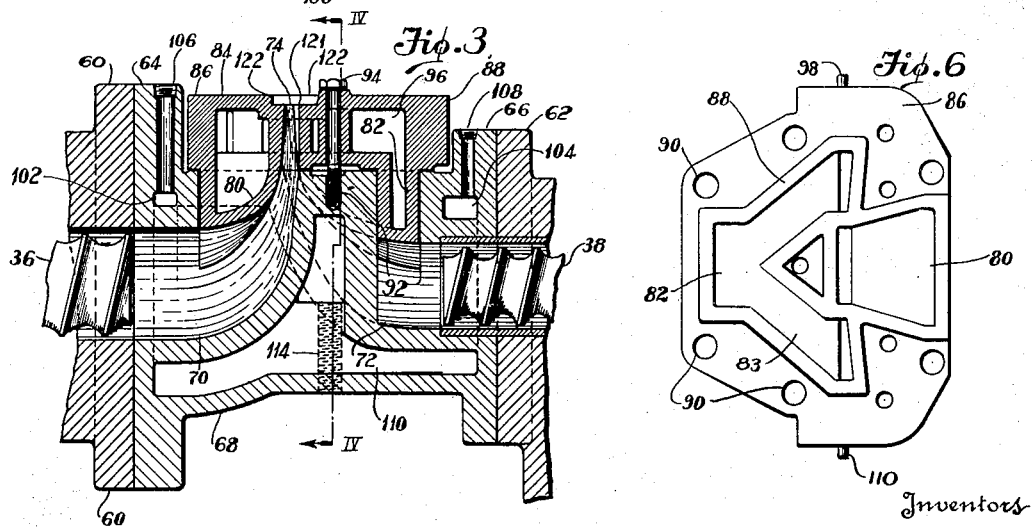
Inventors
Robert W. Snyder and
Jorgen I. Haase
By
Attorneys Patented Mar. 27, 1934

1,952,469

UNITED STATES PATENT OFFICE 1,952,469

COMBINATION PRODUCT

Robert W. Snyder and Jorgen I. Haase, Akron, Ohio, assignors to Wingfoot Corporation, Wilmington, Del., a corporation of Delaware Application January 17, 1931, Serial No. 509,388

10 Claims. (Cl. 18—13)

This invention relates to methods of and apparatus for extruding rubber compounds and it has particular relation to methods of and apparatus for extruding sheets or strips of such material.

An object of the invention is to provide a method and apparatus of the above indicated character, the use of which results in the formation of composite strips comprising a plurality of distinct types of stock arranged in edge to edge relation and in a common plane.

In the manufacture of sheets of unvulcanized rubber compounds, notably such strips as are employed as tread units for pneumatic tires, it is sometimes desirable to form the strip as a composite body comprising a plurality of relatively narrow strips comprising materials of different physical characteristics or color. In a pneumatic tire tread element, the central portion which, in use upon a tire carcass contacts with the surface of the road, preferably is formed of a relatively stiff stock which is highly loaded with carbon black and which is therefore particularly designed to resist abrasive wear. The side portions of the unit which normally lie upon the side walls of the tire carcass may, if desired, be formed of different and cheaper stocks or they may be formed of stocks which are more flexible in character and better adapted to conduct heat than the stock constituting the road contacting area of the tread.

In order to form such units, it has heretofore been proposed to form a plurality of relatively narrow strips of the desired characteristics by the ordinary methods of extruding or calendering. These strips were then united along their edges by manual operations. These methods manifestly involved considerable labor and were relatively expensive.

This invention involves the provision of a method of and apparatus for forming composite strips of rubber compounds in which a plurality of types of compounds are simultaneously extruded from a plurality of cylinders through a common die head where they are brought into edge to edge relation and thus united into a unitary whole.

For a better understanding of the invention, reference may now be had to the accompanying drawing, forming a part of the specification, in which:

Fig. 1 is an elevational view of a machine embodying the principles of the invention;

Fig. 2 is a fragmentary view of a die head;

Fig. 3 is a cross-sectional view taken substantially along the line III—III of Fig. 2;

Fig. 4 is a cross-sectional view taken substantially along the line IV—IV of Fig. 3;

Fig. 5 is a plan view of a die plate employed in connection with the die head disclosed in Figs. 2, 3 and 4; and Fig. 6 is a plan view of a cap employed in connection with the die head disclosed in Figs. 2, 3 and 4.

In practicing the invention, a casting comprising a base 10 is provided with pedestals 12 and 14 which support motors 16 and 18. The first mentioned motor is directly connected by means of a shaft 20 to a conventional reducing gear 22. The motor 18 is provided with a drive shaft 24 upon which is mounted a grooved pulley 26 having V-belts 28 mounted thereon. The belts are also trained about a second grooved pulley 30, which is mounted upon a shaft 32 parallel to the shaft 24. The latter shaft drives a conventional reducing gear 34. The reducing gears 22 and 34 respectively drive coaxially aligned conveyor screws 36 and 38, the latter of which is preferably of materially lesser diameter than the former.

The screws in turn are rotatably mounted within conveyor cylinders 40 and 42 mounted upon pedestals 44 and 46 constituting portions of the base 10. The cylinders are respectively provided with hoppers 48 and 50 into which are fed strips 52 and 54 of unvulcanized rubber by means of conveyors 56 and 58 of conventional design. Adjacent ends of the cylinders 40 and 42 have flanges 60 and 62 which mate with corresponding flanges 64 and 66 that constitute attaching portions of a die head 68 which is common to both cylinders.

As best shown in Fig. 3, throats 70 and 72 are formed within the die head 68 and curve upwardly and forwardly in converging relation with respect to each other and have slightly flared mouths 73. An upwardly projecting boss 74 (Fig. 2) of triangular cross-sectional contour is disposed in the throat 72 with an angle 75 thereof directed along the axis of the cylinder 42. This boss divides the throat into two passages 76 and 78 which, as indicated in Fig. 2, extend in diverging relation from the main body of the throat 72 to form a Y. The side of the boss 74 opposite to the apex directed along the cylinder constitutes the forward wall of the throat 70, and, as best shown in Fig. 2, is so disposed that the throat 70 and the passages 78 and 76 open upwardly in a common plane extending transversely with respect to the axis of the die head.

The upper walls of the throats 70 and the passages 76 and 78 are respectively formed by downwardly projecting bosses 80 and 82 upon the lower side of a cap 84 which rests upon the top of the boss 74. As shown in Fig. 6, the boss 82 has branches 83 corresponding to the passages 76 and 78. The cap 84 is also formed with a projecting flange 86 having machined portions 88 that rest upon the upper face of the die head 68. For purposes of maintaining the cap in position, a plurality of bolt holes 90 are formed in the cap in registering relation with respect to corresponding tapped holes 92 (Fig. 3), and conventional stud bolts 94, one of which is indicated in Fig. 3, are secured therein. The cap 84 is chambered, as indicated at 96, and cooling fluid is circulated therethrough by means of inlet and outlet conduits 98 and 100. Likewise, the die head 68 is formed with circular chambers 102 and 104 which respectively communicate with an inlet conduit 106 and an outlet conduit 108. The chambers 102 and 104 communicate with a longitudinally extending chamber 110, which is divided along a vertically disposed median plane by means of a fin 112. As best shown in Fig. 3, this fin projects upwardly partially within the boss 74 and is provided with an inlet conduit 114 for cooling fluid.

Strips of rubber compound 116, 118 and 120 (see Fig. 5), as they respectively emerge from the throat 70 and the passages 76 and 78, are united along their marginal edges by passing them through an opening 121 of desired configuration in a die plate 122, which is secured in a transversely extending slot formed in the upper face of the cap 84. A tread unit 124, as it emerges from the opening in this plate, is supported upon a guide plate 126 and is conducted over the reducing gear 34 upon a conveyor belt 128, which is disposed in a vertical plane coinciding with the axis of the cylinders 40 and 42. The conveyor belt is supported and driven by conventional pulleys 130, 132 and 134 and discharges the stock 124 upon a forwardly and downwardly extending apron 136. The latter directs the stock into a tank 138 which preferably is partially filled with a suitable cooling fluid. The tread unit is conducted along this tank and through the cooling fluid by means of a conventional conveyor belt 140 mounted upon pulleys 142 and 144.

In the operation of the machine, strips 52 and 54 of rubber compound are fed into the hoppers 48 and 50 by means of the conveyors 56 and 58. Preferably, the strip 52 is dark in color and is formed of a compound peculiarly designed for resistance to abrasive wear to which the central zone of a tread unit of a pneumatic tire is subjected. The strip 54 preferably is light in color, and is a compound peculiarly designed for the formation of sidewall portions of tread units. Such compound may be of less expensive material than the strip 52 and may also possess greater flexibility and a higher conductivity than the previously mentioned strip. The strips 52 and 54 are deposited upon the conveyor screws 36 and 38 and are forced by the latter through the cylinders 40 and 42 into the throats 70 and 72.

The compound from the cylinder 40 is then conducted forwardly and upwardly through the central portion of the opening 121 in the die plate 122 in the form of a tread strip 116. The compound, as it is forced from the cylinder 42, is divided into the two strips 118 and 120 by the upwardly extending boss 74 and is conducted along the channels 76 and 78 in such manner that the adjacent edges thereof are brought pressed into contact with the edges of the strip 116. The streams of compound are thus united into a unitary strip and emerge from the opening in the die plate as a tread unit 124, the margins of which are of a distinctly different type of compound from the central zone thereof. Since the margins of the tread strip are relatively thin, while the central portion is relatively thick, a smaller amount of compound is conveyed by the screw 38 than by the screw 36. For that reason, the screw 38 is of materially less diameter than the screw 36. Variations in the relative outputs of the two screws may also be obtained by regulating the relative speeds of the motors 16 and 18. The lines of demarkation between central tread strip 116 and the side strips 118 and 120 are sharp, clear and regular.

The strip of tread stock 124, as it emerges from the die plate, is conducted away from the machine by the plate 126, conveyor 128, the plate 136 and deposited upon the conveyor 140 within the tank 138. While it is in this tank, the stock is cooled to the desired temperature by contact with a suitable cooling fluid. The tread stock thus formed may be cut into units of suitable length for application to pneumatic tires and assembled into the latter by conventional methods. Since these methods constitute no portion of the present invention, they are not described.

Although we have illustrated and described but the preferred forms of the invention, it will be apparent to those skilled in the art that the invention is not so limited but that various modifications may be made therein without departing from the spirit of the invention or from the scope of the appended claims.

What we claim is:

1. A method of manufacturing tread strips for pneumatic tires which comprises continuously forming a strip of the material of a character suitable for the formation of the road contacting area of the tread, simultaneously forming a strip suitable for the formation of the sidewall portions of the tread, dividing the latter strip along a median line and bringing adjacent margins thereof into contact with the margins of the first mentioned strip.

2. A method of manufacturing tread stock for pneumatic tires comprising continuously forming a strip of material of characteristics desirable for the formation of the road contacting area of the tire, simultaneously forming a strip suitable for the formation of the sidewall portions of the tread stock, splitting the latter mentioned strip into two portions, passing the strips through a member whereby to bring the margins of the strips into mating relation to form a composite tread body.

3. A machine for manufacturing composite strip material from plastic compounds which comprises a pair of cylinders disposed adjacent to each other, a common die head disposed between the adjacent ends of the cylinders, means for dividing the stream of compound from one cylinder into two branches and for bringing the margins thereof into contact with the margins of the stream from the other cylinder.

4. A machine for extruding composite sheets of plastic material comprising a pair of cylinders disposed in coaxial alignment, conveyor screws disposed in the cylinders, means for driving the screws, a common die disposed between adjacent ends of the cylinders and having a single die opening formed therein, one of said cylinders being of materially smaller diameter than the other cylinder.

5. A machine for manufacturing strips of plastic material comprising a pair of coaxially aligned horizontal cylinders, conveyors in the cylinders, a common die head between the cylinders having a common die opening of a contour suitable for the formation of relatively thin strips, the plane of said opening being disposed transversely of the axes of the cylinders.

6. A machine for extruding composite strips of plastic material comprising a pair of cylinders, means for conveying plastic material to the cylinders, a common die head for the cylinders, said die head having an elongate die opening formed therein, a single passage for compound leading from one of the cylinders through the die head to the die opening, a branched passage for material leading from the other cylinder through the die head to the die opening, the branches discharging approximately in the same plane as the passage from the first mentioned cylinders upon opposite sides of the last mentioned passage.

7. Apparatus of the type described including a single die, a pair of cylinders extending to said die, conveyor screws disposed in the cylinders, means for driving said screws, said die having a single passage extending to one cylinder and a double passage extending to the other cylinder, the double and single passages joining together at the extruding end of the die.

8. In combination, a die, a plurality of means for extruding plastic to said die, said die having passages adapted to form the plastic in sheets, means in the die for splitting one of the sheets longitudinally and applying the split portions thus produced on opposite sides of an unsplit sheet.

9. Apparatus for extruding plastic material including a plurality of extruding means, a die connected to the plurality of extruding means, said die having a curved passageway providing for the extrusion of the plastic at an angle to the plurality of extruding means, said die also having a pair of passages extending on both sides of the first named passageway and connected to other extruding means than the first named passageway and an auxiliary die head removably secured on the first named die and having openings therein positioned to bring the passages and passageway of the die together to form a composite extruded plastic.

10. Apparatus for extruding plastic material including a plurality of extruding means, a die detachably connected to and between the plurality of extruding means, said die having a passageway providing for the extrusion of the plastic, said die having a second passage extending adjacent the first named passageway and connected to other extruding means than the first named passageway and an auxiliary die head having openings therein positioned to positively bring the passage and passageway of the die together to form a composite extruded plastic.

ROBERT W. SNYDER.
JORGEN I. HAASE.